US012110739B2

(12) United States Patent
Wang et al.

(10) Patent No.: US 12,110,739 B2
(45) Date of Patent: Oct. 8, 2024

(54) RESHAPABLE WINDOW WITH COVER PANEL

(71) Applicant: A&C FUTURE, INC., Newport Beach, CA (US)

(72) Inventors: Jiuqi Wang, Santa Ana, CA (US); Xunmin Jiang, Irvine, CA (US); Zhuangboyu Zhou, Santa Ana, CA (US); Sichen Li, Santa Ana, CA (US); Ju Gao, Newport Beach, CA (US); Han Qin, Newport Beach, CA (US); Jiayang Qin, Newport Beach, CA (US); Keguan Zou, Irvine, CA (US)

(73) Assignee: A&C FUTURE, INC., Irvine, CA (US)

( * ) Notice: Subject to any disclaimer, the term of this patent is extended or adjusted under 35 U.S.C. 154(b) by 207 days.

(21) Appl. No.: 17/933,042

(22) Filed: Sep. 16, 2022

(65) Prior Publication Data

US 2024/0093548 A1 Mar. 21, 2024

(51) Int. Cl.
*E06B 9/24* (2006.01)

(52) U.S. Cl.
CPC ........ *E06B 9/24* (2013.01); *E06B 2009/2417* (2013.01)

(58) Field of Classification Search
None
See application file for complete search history.

(56) References Cited

U.S. PATENT DOCUMENTS

| | | | | |
|---|---|---|---|---|
| 4,187,896 | A * | 2/1980 | Shore | E06B 9/24 29/407.05 |
| 4,344,473 | A * | 8/1982 | Shore | E06B 9/24 160/121.1 |
| 5,222,540 | A * | 6/1993 | Varga | E06B 3/927 160/202 |
| 6,952,897 | B1 | 10/2005 | Mauer | |
| 10,322,197 | B1 * | 6/2019 | Williams | A61L 9/20 |
| 10,815,722 | B2 | 10/2020 | Jones | |
| 11,053,727 | B2 | 7/2021 | Houk | |
| 11,359,433 | B2 * | 6/2022 | Toth | E06B 9/24 |
| 2012/0144743 | A1 | 6/2012 | Piney | |
| 2020/0270936 | A1 | 8/2020 | Sargent | |
| 2023/0358096 | A1 * | 11/2023 | Zou | E04B 1/34363 |
| 2024/0093548 | A1 * | 3/2024 | Wang | E06B 9/24 |

* cited by examiner

*Primary Examiner* — Joshua K Ihezie
(74) *Attorney, Agent, or Firm* — INNOVATION CAPITAL LAW GROUP, LLP; Vic Lin

(57) ABSTRACT

An apparatus provides for the flexible adjustment of the position of the windows, as well as for the ability to change the light transmission area of a single window, without wasting too much space. The apparatus can transform windows into completely opaque walls, for example, to achieve partial or complete light blockage by moving several wall panels hidden inside the sill up and down to specified positions. A set of push plates inside the sill can be used to displace the wall panels horizontally and a set of lifting plates on the window frame can be used to move the wall panels up and down along a track. At the same time, after selecting the specified position, the corresponding position can have a stick to push the wall panel into the specified position and tighten and fix the wall panel in the desired position.

20 Claims, 9 Drawing Sheets

RESHAPABLE WINDOW WITH COVER PANEL

BACKGROUND OF THE INVENTION

1. Field of the Invention

Embodiments of the invention relate generally to window construction. More particularly, embodiments of the invention relate to a reshapable window having adjustably positionable window covers.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The windows of modern houses are gradually becoming larger, and although this change can increase more sunlight into the house and increase the view from the house, at the same time the window area is too large will lead to the problem of wasted space in front of the window, a poor blackout by curtains, and poor privacy.

In view of the foregoing, there is a need for methods and devices to solve the above problems with multiple and/or large windows.

SUMMARY OF THE INVENTION

Embodiments of the present invention relate to an adjustable covering comprising a storage chamber operable to store one or more cover panels; opposing rails extending upward from the storage chamber, the opposing rails defining a space therebetween; and movable diverter sticks disposed in the rails, the diverter sticks operable to guide one of the one or more cover panels from a travel path from the storage chamber to a desired use position selected from one or more possible use positions, the diverter stick movable to fix the one of the one or more cover panels into the use position, wherein each of the one or more cover panels are movable to respective ones of the one or more possible use position along the rails to selectively block all or a portion of the space.

Embodiments of the present invention provide an adjustable window covering, comprising a storage chamber disposed at a lower end of a window, the storage chamber operable to store a plurality of cover panels; opposing rails extending upward from the storage chamber, the opposing rails defining a space therebetween, the space located in front of the window; and movable diverter sticks disposed in the rails, the diverter sticks operable to guide one of the plurality of cover panels from a travel path from the storage chamber to a desired use position selected from a plurality of possible use positions, the diverter stick movable to fix the one of the one or more cover panels into the desired use position, wherein each of the plurality of cover panels are movable to respective ones of the plurality of possible use position along the rails to selectively block all or a portion of the space; the opposing rails each include a track, the track including a cover panel movement channel, permitting the one of the plurality of cover panels to move along an entirety of the space, and a plurality of retention channels, each independently operable to receive the one of the plurality of cover panels; and when the desired use position is selected and the diverter sticks are moved to direct the one of the plurality of cover panels into desired use position, the one of the plurality of cover panels is moved from the cover panel movement channel to the retention channel and into the desired use position.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1A:
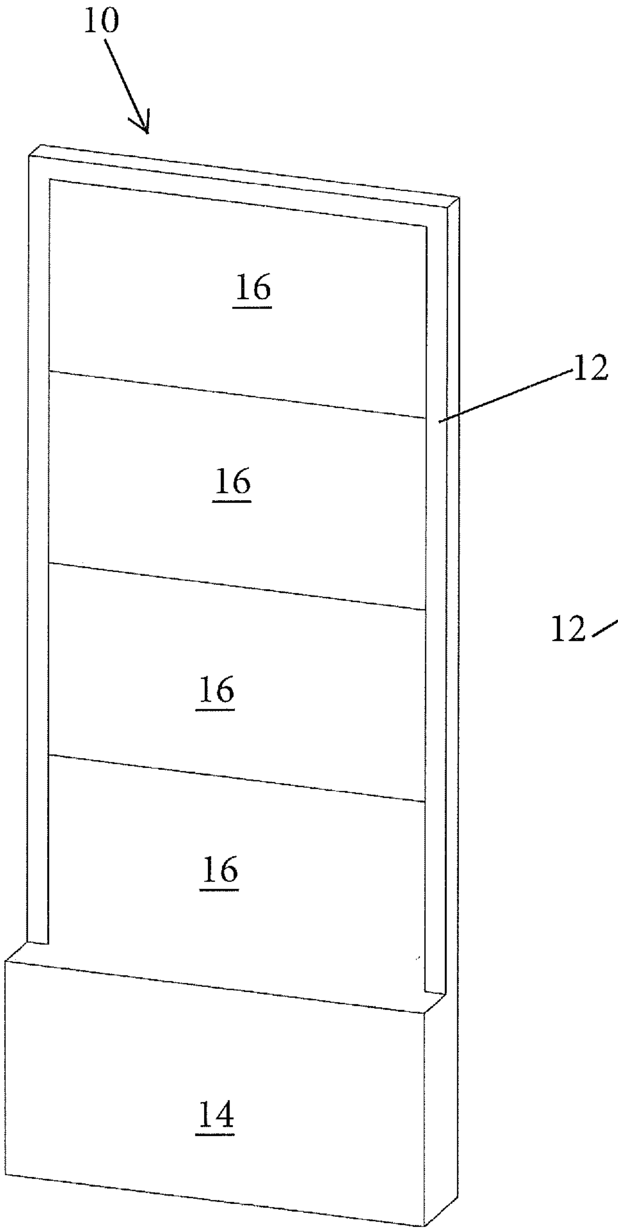
FIG. 1A illustrates front perspective view of a window cover with the cover panels in a completely closed configuration.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide apparatus that provides for the flexible adjustment of the position of the windows, as well as for the ability to change the light transmission area of a single window, without wasting too much space. The apparatus can transform windows into completely opaque walls, for example, to achieve partial or complete light blockage by moving several wall panels hidden inside the sill up and down to specified positions. A set of push plates inside the sill can be used to displace the wall panels horizontally and a set of lifting plates on the window frame can be used to move the wall panels up and down along a track. At the same time, after selecting the specified position, the corresponding position can have a stick to push the wall panel into the specified position and tighten and fix the wall panel in the desired position.

Figure 1B:
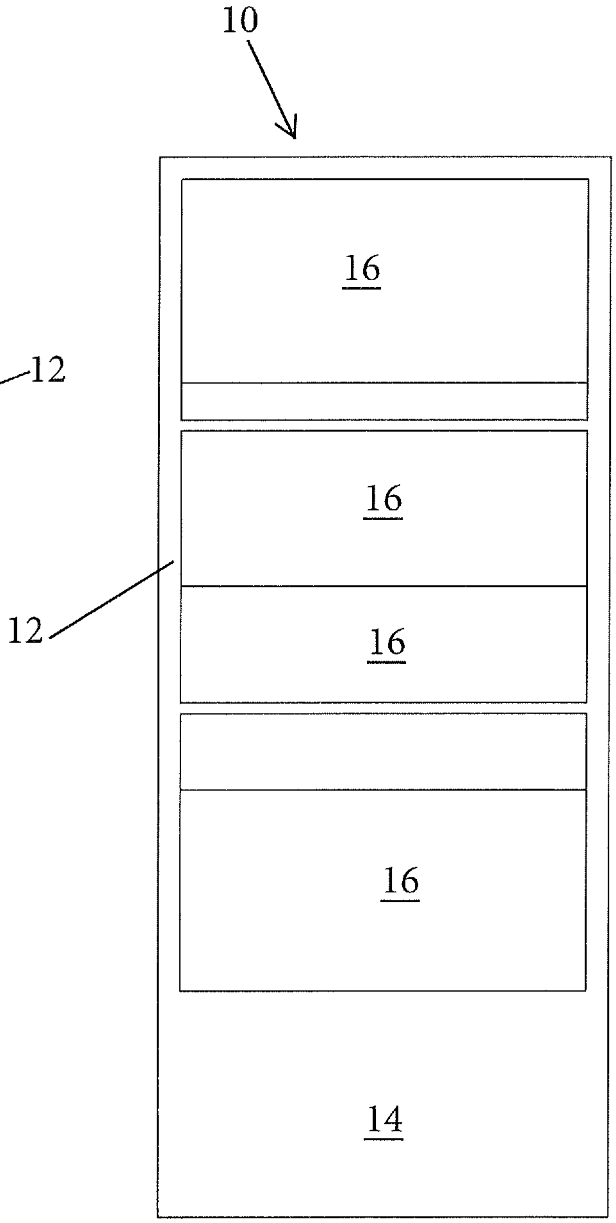
FIG. 1B illustrates a back view of the window cover of FIG. 1A.

Referring to FIGS. 1A and 1B, a window cover apparatus 10 (also referred to simply as window cover 10 or apparatus 10) can include a frame 12 extending from a storage chamber 14. Typically, the frame 12 forms a closed shape with an open inside region. Typically, the frame is rectangular in shape, as illustrated.

One or more cover panels 16 can be moved between a storage position, where the one or more cover panels 16 are disposed is the storage chamber 14, to a use position, where the one or more cover panels 16 span between the frame 12, outside the storage chamber 14. FIGS. 1A and 1B illustrate all of the cover panels 16 moved into the use position, completely blocking the inside of the frame 12. While FIGS. 1A and 1B show four window covers 16, it should be understood that the size and number of window covers may vary, depending on the application. Further, while the use position shown in FIGS. 1A and 1B show all four window covers 16 disposed, it should be understood that any number of window covers 16 may be deployed in the use position. Further, any number of window covers 16 may be deployed in the use position and may be deployed at any of the positions. For example, one window cover 16 may be disposed on the top region, or in the bottom region, or in a position therebetween. Further, the window covers 16 may be deployed into the use position in any order at various times. For example, during a sunset, a user may desire to have one window cover 16 deployed in the upper position, to block direct view of the sun. As the sun sets, a second window cover 16 may be deployed in the next lower position, or the window cover in the uppermost position may be re-deployed in the next lower position. Further, if a user desires a "smaller" window, the user could deploy one of the cover panels 16 in the uppermost position and one of the cover panels 16 in the lowermost position. Of course, these are merely examples of possible deployment and use possibilities.

The storage chamber 14 may have an open top, as can be seen in FIG. 1A, permitting the cover panels 16 to be easily and smoothly deployed. A cover (not shown) can be provided that can create a windowsill over the storage chamber 14, for example. Such a cover may be removable, hingedly connected, and/or automatically or manually movable to permit cover panel movement in and out of the storage chamber 14.

Figure 2A:
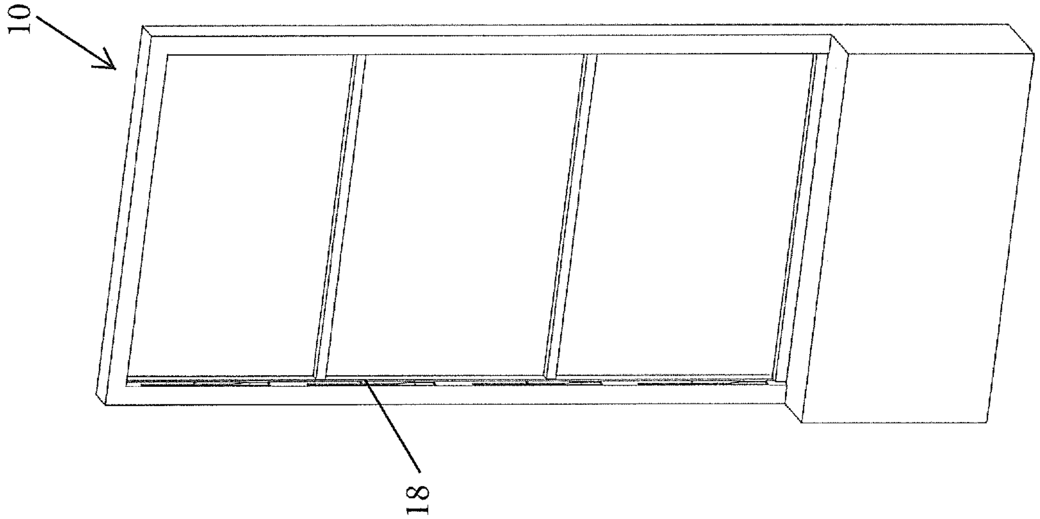
FIG. 2A illustrates a front perspective view of a window cover with the cover panels in a completely open configuration.
Figure 2B:
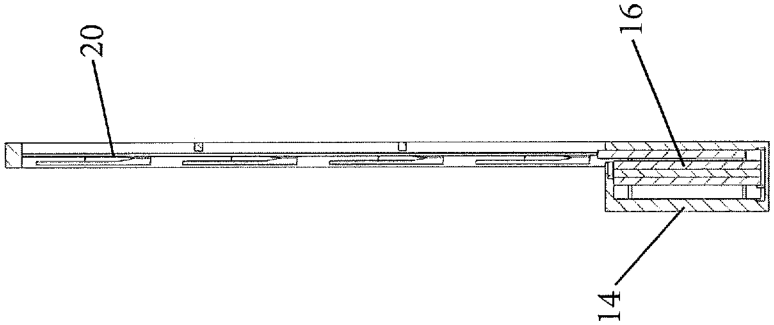
FIG. 2B illustrates a cross-sectional view of the window cover of FIG. 2A.
Figure 2C:
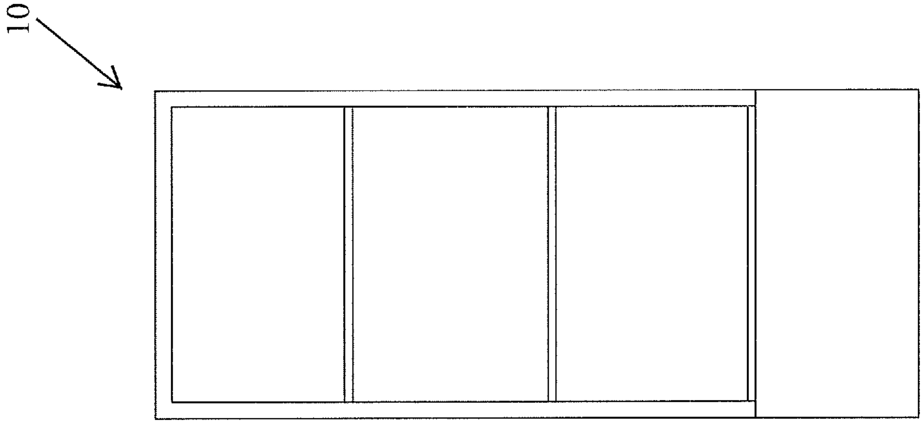
FIG. 2C illustrates a back view of the window cover of FIG. 2A.
Figure 3C:
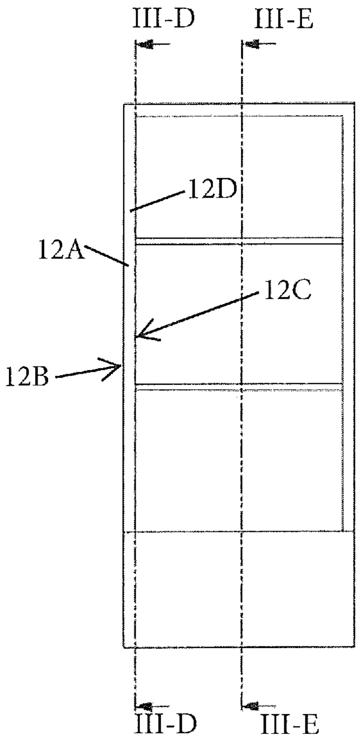
FIG. 3C illustrates a front view of the window cover of FIG. 3A.
Figure 3D:
FIG. 3D illustrates a cross-sectional view taken along line III-D-III-D of FIG. 3A.
Figure 3E:
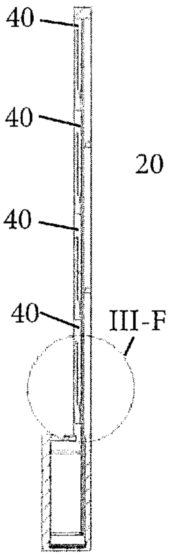
FIG. 3E illustrates a cross-sectional view taken along line III-E-III-E of FIG. 3A.
Figure 3A:
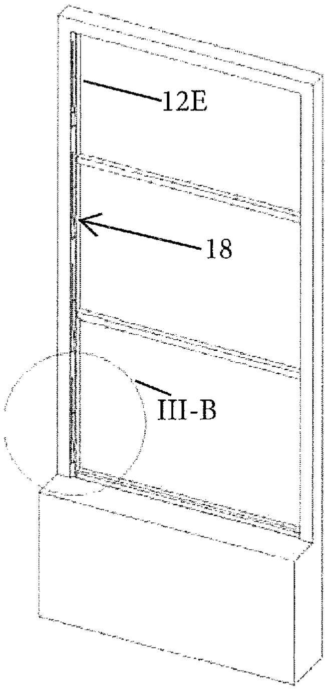
FIG. 3A illustrates a front perspective view of the window cover without the cover panels installed for clarity purposes.
Figure 3B:
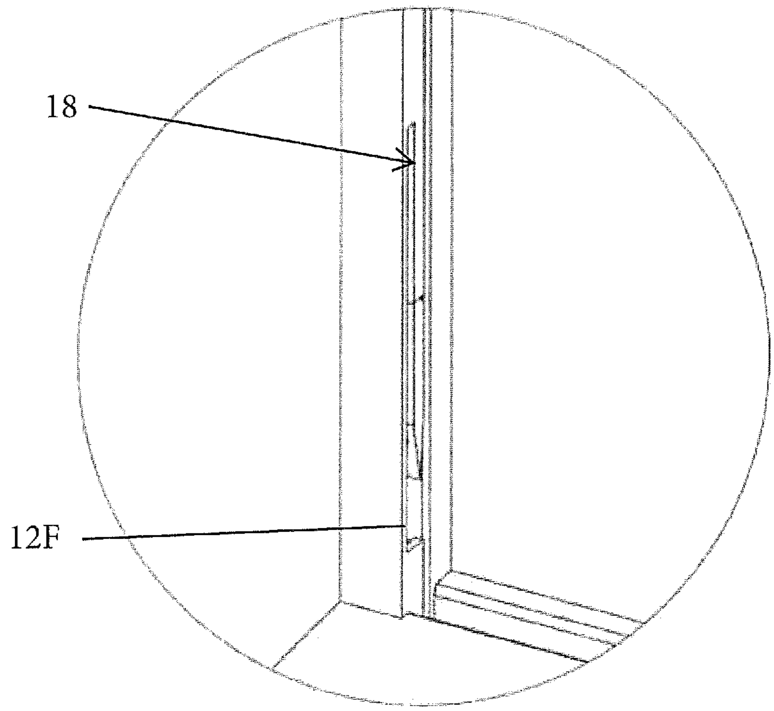
FIG. 3B illustrates a detailed view of portion III-B of FIG. 3A.
Figure 3F:
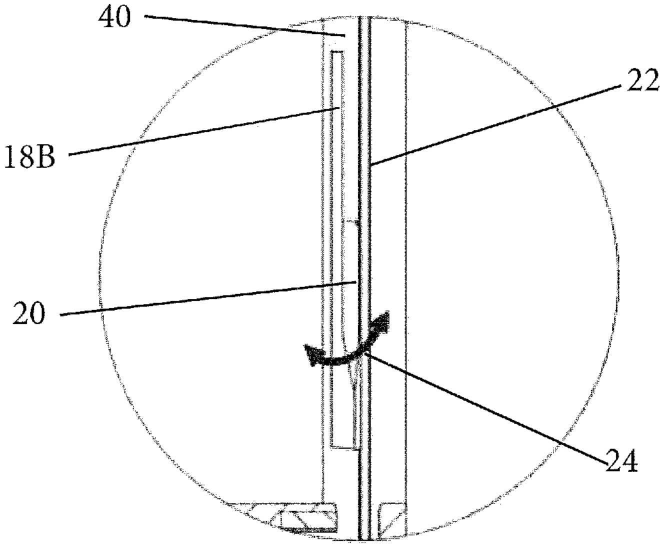
FIG. 3F illustrates a detailed view of portion III-F of FIG. 3E.

Referring to FIGS. 2A through 2C, the apparatus 10 is shown with the cover panels 16 each stored in the storage chamber 14. FIG. 2A shows a track system 18 that is described in greater detail below. FIG. 2B shows a movable diverter stick 20 (or simply, stick 20) that, as discussed in greater detail below, permit the cover panels 16 to selectively be disposed in a desired one of the use positions and retain the cover panel 16 at such location, further permitting other cover panels 16 to be deployed as desired.

Referring now to FIGS. 3A through 5H, details of the apparatus 10 are disclosed. The track 18 may be formed in upwardly extending frame members 12A of the frame 12 (see FIG. 1A). The frame members 12A may have an exterior side 12B and an interior side 12C. A front member 12D spans from the exterior side 12B to the interior side 12C of the frame members 12A. A rear member 12E spans from the exterior side 12B to the interior side 12C of the frame members 12A. The interior side 12C can generally be open, so that the front member 12D, exterior side 12B and the rear member 12E form a squared C-shape. In some embodiments, as shown in FIG. 3B, a lip 12F may extend inward at the interior side 12C of the front member 12D and/or the rear member 12E, partially closing the opening of the squared C-shape.

One or more retention slot members 40 may extend inward from the front member 12D at the interior side 12C thereof. The retention slot members 40 may be shaped as an upside down L, where the base of the upside down L is attached to or formed integrally with the frame 12 and the leg 42 of the upside down L defines a retention channel 18B and a panel movement channel 18A. The base of the retention slot member 40, being attached to or formed integrally with the frame 12, provides a stop mechanism, preventing the cover panel 16 to be lifted beyond a desired position when the cover panel 16 is in the retention channel 18B, as discussed below.

Figure 5E:
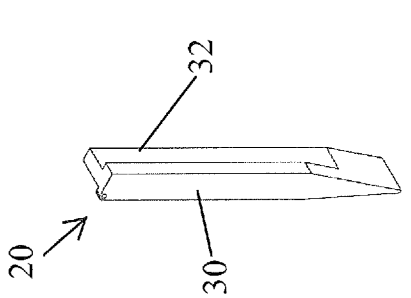
FIG. 5E illustrates a front perspective view of a left side stick according to an exemplary embodiment of the present invention.
Figure 5H:
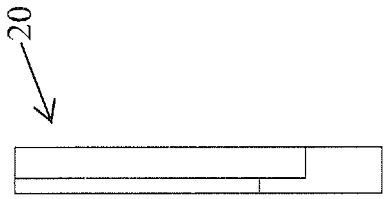
FIG. 5H illustrates a side view of the right side stick of FIG. 5E.
Figure 5G:
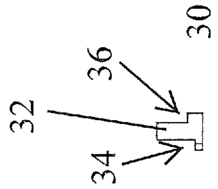
FIG. 5G illustrates a top view of the right side stick of FIG. 5E.
Figure 5F:
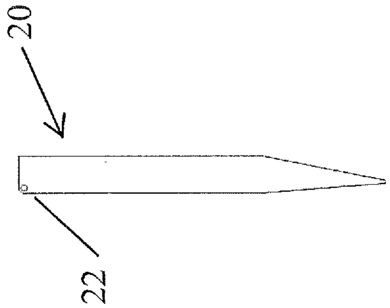
FIG. 5F illustrates a front view of the right side stick of FIG. 5E.
Figure 5A:
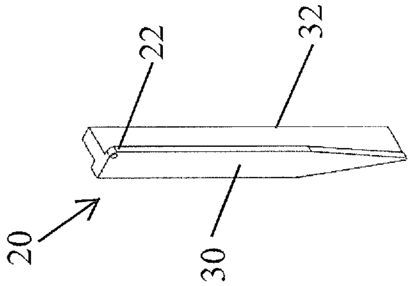
FIG. 5A illustrates a front perspective view of a left side stick according to an exemplary embodiment of the present invention.
Figure 5D:
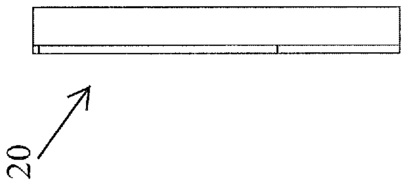
FIG. 5D illustrates a side view of the left side stick of FIG. 5A.
Figure 5C:
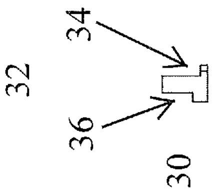
FIG. 5C illustrates a top view of the left side stick of FIG. 5A.
Figure 5B:
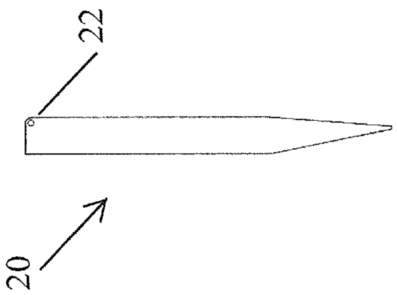
FIG. 5B illustrates a front view of the left side stick of FIG. 5A.

A movable stick 20 can extend downward from the end of the leg 42 of the retention slot member 40. The stick 20 can pivot along a pivot axis 22. The stick 20 may, for example, be attached to the frame 20 with a pivot pin (not shown) inserted in a hole in the stick 20 that forms the pivot axis 22. The stick 20 can move from side to side, as shown by the arrow 24 in FIG. 3F. As shown best in FIGS. 5A through 5H, the stick 20 can have a generally T-shaped cross-section, with the top 30 of the T facing inward and the base 32 pointing outward toward the exterior side 12B. When viewed from the top, as shown in FIGS. 5C and 5G, the stick 20 can further define the panel movement channel 18A along a rear side 34 of the stick 20, and the stick 20 can further define the retention channel 18B along a front side 36 of the stick 20. In some embodiments, the top 30 of the stick 20 may be thicker at the front side 36 as compared to the thickness of the top 30 at the rear side 34, as illustrated in FIGS. 5C and 5G. Such a configuration, while not required, may better secure the cover panels into the use position.

Figure 4:
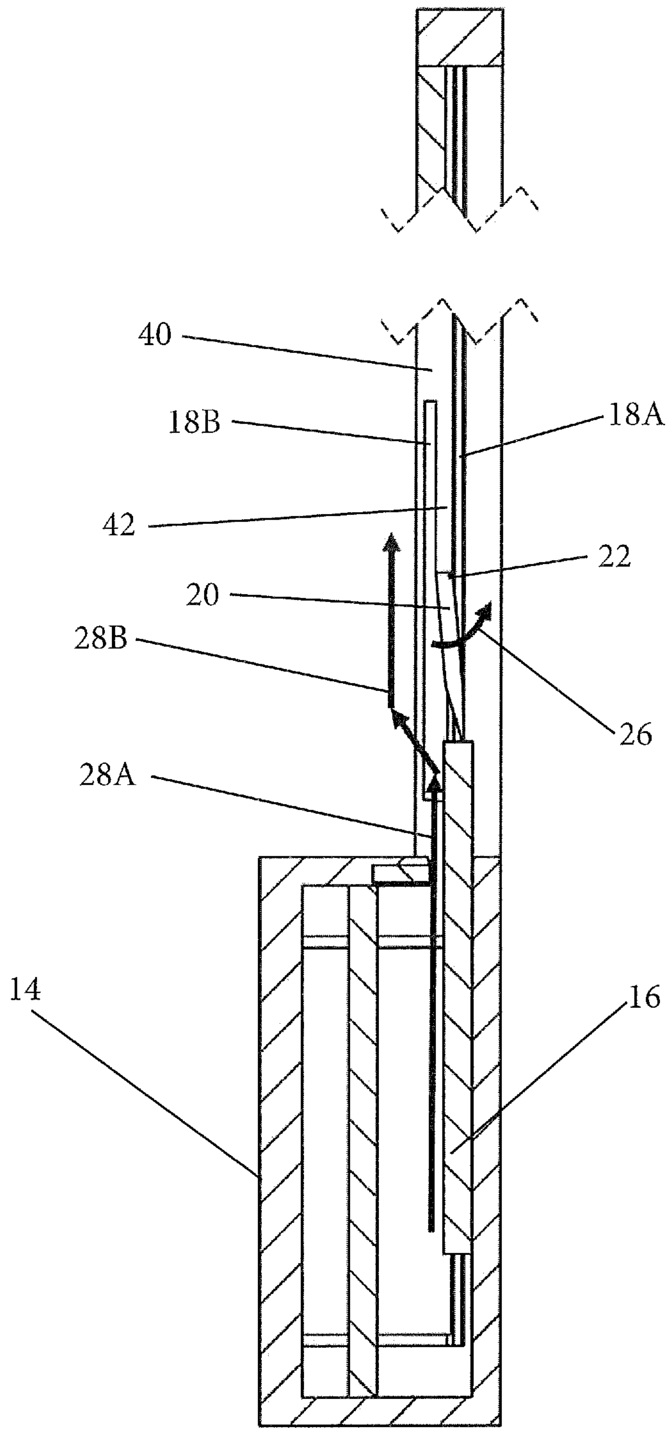
FIG. 4 illustrates a detailed cross-sectional view showing motion trajectory of one of the cover panels moving from the storage chamber.

FIG. 4 illustrates movement of a cover panel 16 from the storage chamber 16. The cover panel 16 can move along arrow 28A, entering panel movement channel 18A. If the cover panel 16 is to be deployed at the lowermost position, then the stick 20 can pivot along the pivot axis 22 toward the back of the apparatus 10, as shown by arrow 26. Such movement can direct the cover panel 16 to move, as shown by arrow 28B, into the retention channel 28B, moving the cover panel 16 adjacent the leg 42 of the retention slot member 40. Once the cover panel 16 is in the use position, the stick 20 can move in a direction opposite that shown by arrow 26 to close off the bottom of the retention channel 18B, thus fixing the cover panel 16 in the use position.

Various mechanisms may be used to move the stick 20. For example, the apparatus 10 may be provided with one or more motors (not shown) and drive elements (not shown) to move the sticks 20 as described herein. In other embodiments, pull levers or similar structures may be used to manually move the sticks 20 to position the desired cover panels in the use position.

Figure 6A:
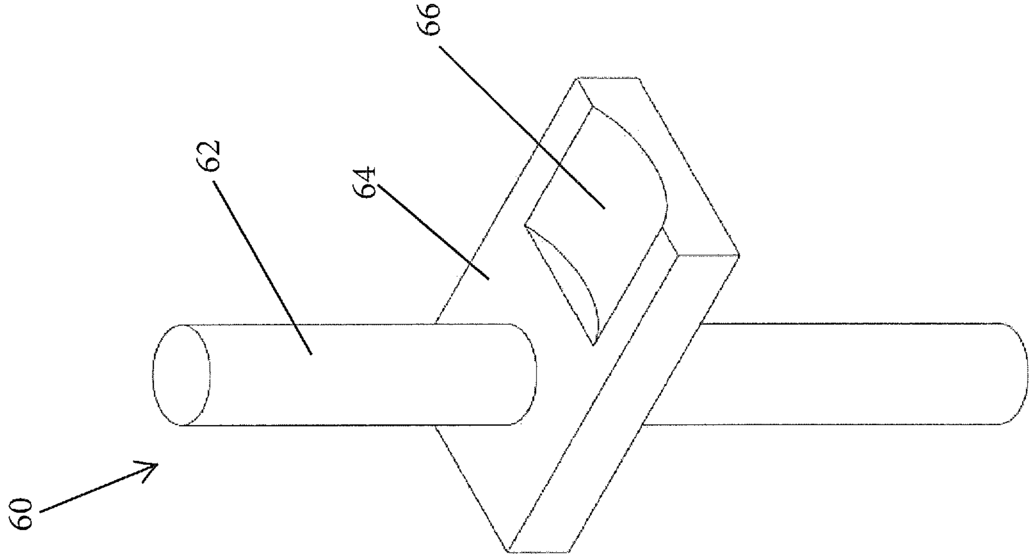
FIG. 6A illustrates a perspective view of a lift plate and lifting mechanism according to an exemplary embodiment of the present invention.
Figure 6B:
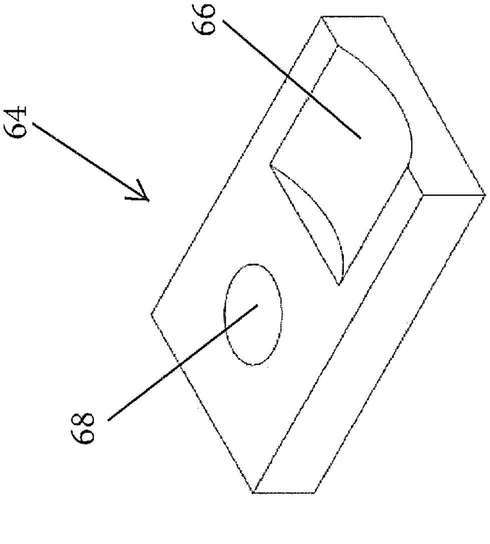
FIG. 6B illustrates a perspective view of the lift plate of FIG. 6A.

Referring now to FIGS. 6A and 6B, in some embodiments, the cover panels may be lifted by a lifting mechanism 60 that includes a lifting plate 64 moving along a shaft 62. Typically, at least two lift mechanisms 60 are disposed on opposite tracks 18 to lift each cover panel. In some embodiments, two lifting plates 64 may be used on each side of the cover panel to be lifted. The lifting plate 64 can include a depression 66 for receiving a portion of the cover panel, as described below. The shaft 62 may be, for example, a threaded shaft that mates with threads in a hole 68 of the lifting plate 64. The apparatus 10 may include one or more motors (not shown) that turn the shaft 62 to move the lifting plates 64 as needed to move the cover panels between the use position and the storage position. The lifting mechanism 60 is one example of a mechanism for moving the cover panels along the tracks 18 of the frame 12, and other mechanisms, as may be known in the art, are contemplated within the scope of the present invention.

Figure 7A:
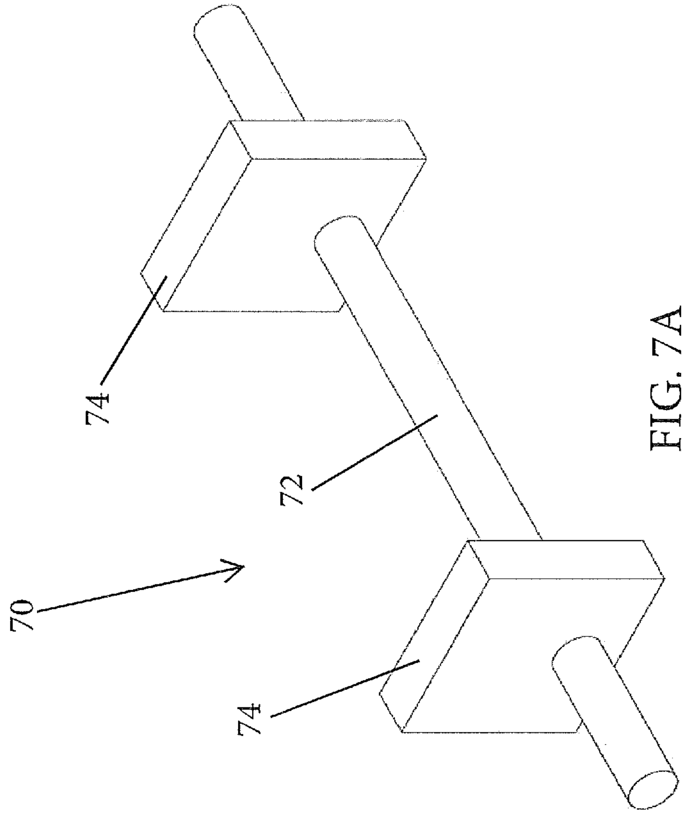
FIG. 7A illustrates a perspective view of a push plate and push mechanism according to an exemplary embodiment of the present invention.
Figure 7B:
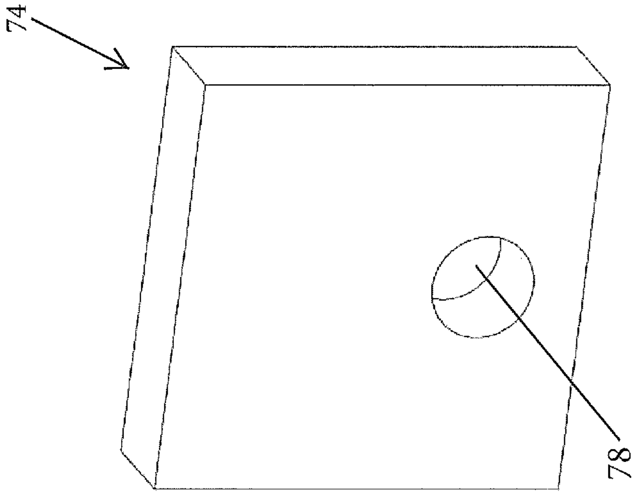
FIG. 7B illustrates a perspective view of the push plate of FIG. 7A.
Figure 8B:
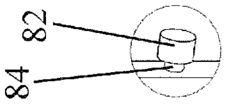
FIG. 8B illustrates a detailed view of the portion VIII of FIG. 8A.
Figure 8A:
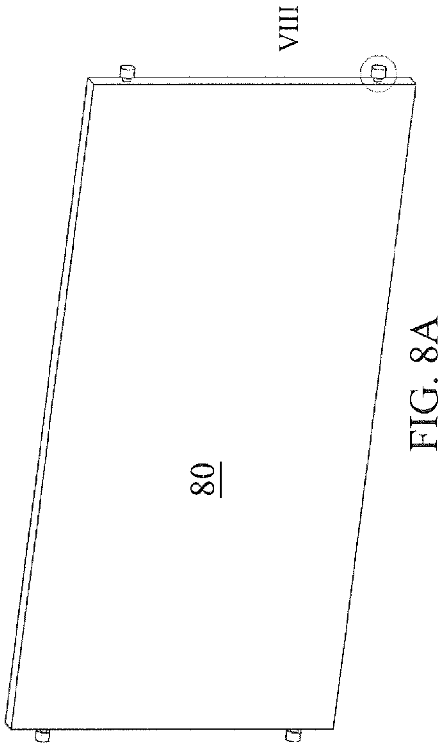
FIG. 8A illustrates a perspective view of a cover panel according to an exemplary embodiment of the present invention.
Figure 8E:
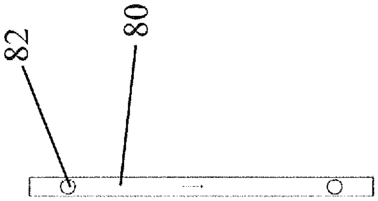
FIG. 8E illustrates a side view of the cover panel of FIG. 8A.
Figure 8D:
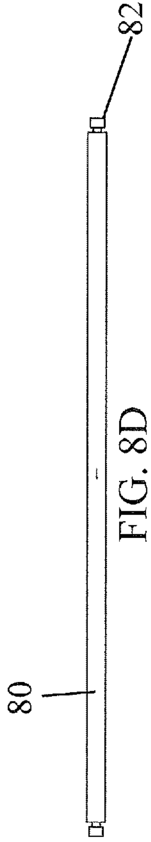
FIG. 8D illustrates a top view of the cover panel of FIG. 8A.
Figure 8C:
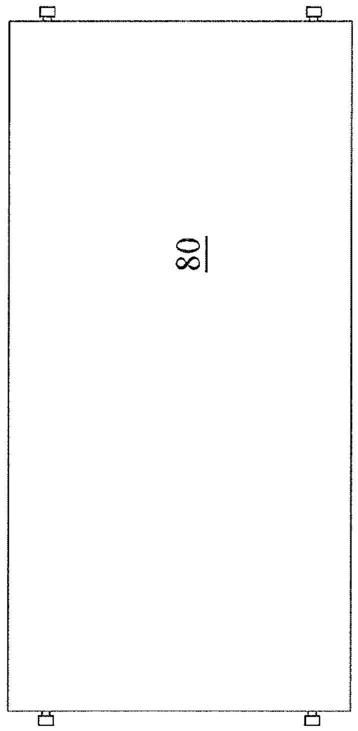
FIG. 8C illustrates a front view of the cover panel of FIG. 8A.

As shown in FIGS. 7A and 7B, a push mechanism 70 can include a shaft 72 and one or more push plates 74 disposed on the shaft. The push plates 74 can include a hole 78 for movement along the shaft 72. The push mechanism 70 may be used to move the cover panels horizontally within the storage chamber 14, moving the cover panels between a fully stored position within the storage chamber 14 and a ready to be deployed position within the storage chamber 14. The push mechanism 70 is one example of a mechanism for moving the cover panels inside the storage chamber and other mechanisms, as may be known in the art, are contemplated within the scope of the present invention.

FIGS. 8A through 8D illustrates a cover panel 80 (which may be used as the cover panel 16, discussed above). The cover panel 80 can include pins with a shaft 84 and a pin head 82 disposed on the sides of the cover panel 80. In the embodiment shown, two pins are disposed on each side of the cover panel 80, but typically, at least one, but also more than two, of such pins may be used on the sides of the cover panel. The pin head 82 may be moved along the retention channel 18B and/or the panel movement channel 18A, as described above, to move the cover panels along the track.

While the above description describes the apparatus 10 as a window cover, permitting large windows to be resized or completely covered, it should be understood that aspects of the present invention may be used for any variable sized covering. Further, it should be understood that the structure described may be built into a window opening, or may be added to an existing window opening. Further, the frame of the apparatus may include the windows when used in new constructure, for example. Further, while the above description involves lifting the cover panels from the storage chamber disposed below the frame, the invention may be configured to be used "upside down", where the storage chamber is positioned above the frame and the cover panels are lowered into position. Such a configuration may be useful where a window extends to a floor of a room, but not to the ceiling.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. An adjustable covering comprising:

a storage chamber operable to store one or more cover panels;

opposing rails extending upward from the storage chamber, the opposing rails defining a space therebetween;

movable diverter sticks disposed in the rails, the diverter sticks operable to guide one of the one or more cover panels from a travel path from the storage chamber to a desired use position selected from one or more possible use positions, the diverter stick movable to fix the one of the one or more cover panels into the use position, wherein each of the one or more cover panels are movable to respective ones of the one or more possible use position along the rails to selectively block all or a portion of the space.

2. The adjustable covering of claim 1, wherein the space is disposed in front of a window.

3. The adjustable covering of claim 1, wherein the opposing rails each include a track, the track including a cover panel movement channel, permitting the one of the one or more cover panels to move along an entirety of the space, and one or more retention channels receiving the one of the one or more cover panels when in the desired use position.

4. The adjustable covering of claim 3, wherein each of the one or more retention channels are aligned in a row.

5. The adjustable covering of claim 4, wherein each of the one or more retention channels include a stopper member to prevent continued motion of the cover panel along the retention channel.

6. The adjustable covering of claim 1, wherein the one or more cover panels include a plurality of cover panels, wherein, when in a storage configuration inside the storage chamber, the plurality of cover panels is arranged horizontally in a front to back face configuration.

7. The adjustable covering of claim 1, wherein each of the one or more cover panels are movable into any one of the one or more use positions.

8. The adjustable covering of claim 3, wherein the diverter sticks are formed as a T-shape.

9. The adjustable covering of claim 8, wherein the T-shape defines a portion of the cover panel movement channel on one side thereof, and the retention channel on another side thereof.

10. The adjustable covering of claim 1, wherein the diverter sticks are movable on a pivot axis, the pivot axis formed in a corner of the diverter stick.

11. The adjustable covering of claim 1, further comprising a lifting mechanism operable to lift the one of the one or more cover panels vertically along the space between the opposing rails.

12. The adjustable covering of claim 1, further comprising a pushing mechanism to move the one or more cover panels horizontally within the storage chamber.

13. An adjustable window covering, comprising:

a storage chamber disposed at a lower end of a window, the storage chamber operable to store a plurality of cover panels;

opposing rails extending upward from the storage chamber, the opposing rails defining a space therebetween, the space located in front of the window;

movable diverter sticks disposed in the rails, the diverter sticks operable to guide one of the plurality of cover panels from a travel path from the storage chamber to a desired use position selected from a plurality of possible use positions, the diverter stick movable to fix the one of the one or more cover panels into the desired use position, wherein each of the plurality of cover panels are movable to respective ones of the plurality of possible use position along the rails to selectively block all or a portion of the space;

the opposing rails each include a track, the track including a cover panel movement channel, permitting the one of the plurality of cover panels to move along an entirety of the space, and a plurality of retention channels, each independently operable to receive the one of the plurality of cover panels; and when the desired use position is selected and the diverter sticks are moved to direct the one of the plurality of cover panels into the desired use position, the one of the plurality of cover panels is moved from the cover panel movement channel to the retention channel and into the desired use position.

14. The adjustable window covering of claim 13, wherein the diverter sticks are formed as a T-shape that defines a portion of the cover panel movement channel on one side thereof, and the retention channel on another side thereof.

15. The adjustable window covering of claim 13, wherein each of the plurality of retention channels are aligned in a row.

16. The adjustable window covering of claim 13, wherein each of the one or more retention channels include a stopper member to prevent continued motion of the cover panel along the retention channel.

17. The adjustable window covering of claim 13, wherein, when in a storage configuration inside the storage chamber, the plurality of cover panels is arranged horizontally in a front to back face configuration.

18. The adjustable window covering of claim 13, wherein each of the plurality of cover panels are movable into any one of the plurality of possible use positions.

19. The adjustable window covering of claim 13, wherein the diverter sticks are movable on a pivot axis, the pivot axis formed in a corner of the diverter stick.

20. An adjustable window covering, comprising:

a storage chamber disposed at a lower end of a window, the storage chamber operable to store a plurality of cover panels;

opposing rails each forming a track, the opposing rails extending upward from the storage chamber, the opposing rails defining a space therebetween, the space located in front of the window, the track including a cover panel movement channel, permitting the one of the plurality of cover panels to move along an entirety of the space, and a plurality of retention channels, each independently operable to receive the one of the plurality of cover panels; and movable diverter sticks disposed in the rails, the diverter sticks operable to guide one of the plurality of cover panels from a travel path from the storage chamber to a desired use position selected from a plurality of possible use positions, the diverter stick movable to fix the one of the one or more cover panels into the desired use position, wherein each of the plurality of cover panels are movable to respective ones of the plurality of possible use position along the rails to selectively block all or a portion of the space.

* * * * *